UNITED STATES PATENT OFFICE.

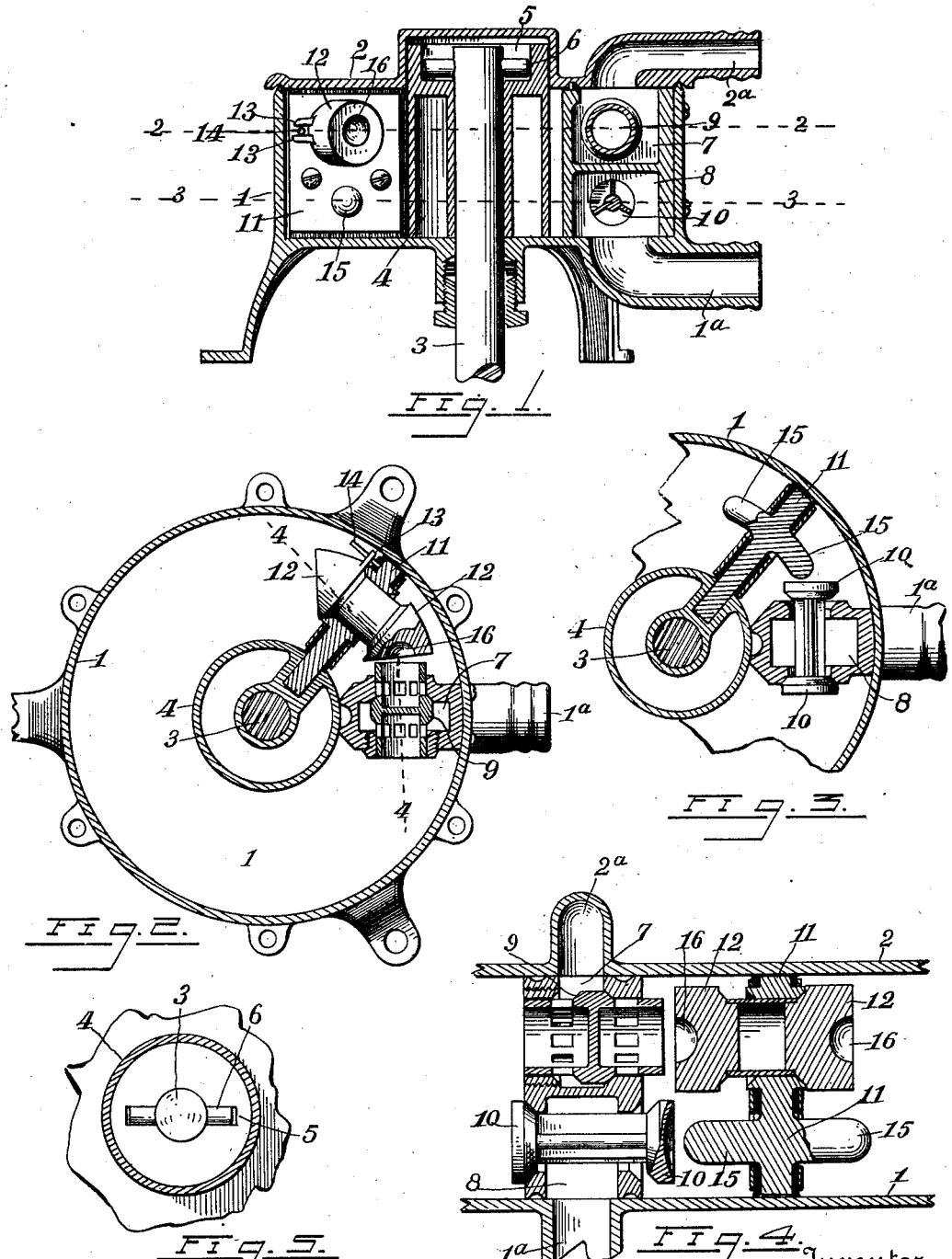

J RAYMOND PLANK, OF GRAND RAPIDS, MICHIGAN.

HYDRAULIC MOTOR.

1,002,445.  Specification of Letters Patent.  Patented Sept. 5, 1911.

Application filed November 14, 1910. Serial No. 592,208.

*To all whom it may concern:*

Be it known that I, J RAYMOND PLANK, a citizen of the United States of America, residing at Grand Rapids, in the county of Kent and State of Michigan, have invented certain new and useful Improvements in Hydraulic Motors; and I do hereby declare the following to be a full, clear, and exact description of the invention, such as will enable others skilled in the art to which it appertains to make and use the same.

My invention relates to improvements in hydraulic motors and more particularly to oscillating motors adapted to operate washing machines, and its object is to dispense with springs in said mechanisms, and to provide the device with various new and useful features hereinafter more fully described and particularly pointed out in the claims, reference being had to the accompanying drawings in which:

Figure 1 is a vertical section of a device embodying my invention; Fig. 2 a horizontal section on the line 2—2 of Fig. 1; Fig. 3 a portion of a horizontal section on the line 3—3 of Fig. 1; Fig. 4 a vertical section on the irregular line 4—4 of Fig. 2; and Fig. 5 a detail in plan view.

Like numbers refer to like parts in all of the figures.

1 represents the usual cylindrical case having a removable head 2; 3 a shaft journaled in the axis of the case; 4 a hub mounted on the shaft and rotative therewith. This hub is detachably connected to the shaft by means of a transverse pin 6 in the shaft engaging a recess 5 in the end of the hub. Extending radially from the hub to the vertical wall of the case is an abutment having an inlet chamber 7 and an outlet chamber 8, the inlet chamber being in communication with an inlet tube 2ª integral with the head, and the outlet chamber communicating with an outlet tube 1ª integral with the case. Each chamber has openings at opposite sides alternately closed by a valve. These tubes form nipples for attachment of suitable hose to supply water to the device and to convey away the same. Within the inlet chamber 7 is a valve 9 having oppositely extended tubular guide members provided with lateral openings close to the valve proper, and a solid middle portion thus forming a double acting valve to alternately close the openings in the opposite sides of the chamber 7. The exhaust chamber 8 is also provided with a spool valve 10 inserted therein, which alternately closes the openings in the opposite sides of the chamber 8 as it is shifted longitudinally. 11 is a radial piston fixed in the hub 4 extending from the same to the interior of the case and provided with packing whereby water cannot pass it in either direction. In the piston opposite the inlet valve 9 is a transversely disposed plunger 12 having a limited longitudinal movement in the piston. The ends of this plunger are adapted to engage the respective ends of the valve 9 and shift the valve longitudinally. Each end of this plunger is adapted to close the tubular guide member of the valve and is provided with a central recess 16 opposite the opening in the end of the guide member of the valve. To prevent rotation of the plunger, it is provided with an arm 13 through which extends a pin 14 fixed in the piston and slidable in the arm. Projections 15 on the piston alternately engage the ends of the spool valve 10 and shift the same when contacting therewith at the end of each stroke of the piston.

In operation, water or other fluid is admitted under pressure through the tube 2ª, enters the inlet chamber 7, and escapes through the openings in the guide member of the valve 9 at the open side of the chamber, the other side being closed by the valve 9. The pressure between the abutment and the piston drives the piston around in the case until the plunger strikes the end of the valve 9 closes this end and starts the valve off its seat. The valve is now balanced by equal pressures at each side and easily moved by the plunger. The piston continues to advance, and thus starts the exhaust valve off its seat, this releases the pressure behind the piston and plunger, and the plunger now shifts, opening this end of the inlet valve. The flow of water therethrough now being reversed, reverses the pressure on the piston cushions the same and completes the shifting of the exhaust valve. Both valves now being shifted, the movement of the piston is reversed and the described operation will be repeated continuously.

What I claim is:—

1. A motor of the class described, comprising a cylindrical case, a rotative hub in the case, an abutment between the hub and one side of the case, an inlet chamber in the abutment having openings at opposite sides, a valve in the chamber alternately closing said openings, a radial piston attached to the hub, a plunger movable in the piston and engaging the valve to shift the same.

2. A motor of the class described, comprising a cylindrical case, a rotative hub in the axis of the case, an abutment between the side of the case and the hub having an inlet chamber and an exhaust chamber, each chamber having opposing openings in its walls, a valve in each chamber alternately closing the openings of the respective chamber, a plunger longitudinally movable in the piston to engage and move the inlet valve, and projections on the piston to engage and move the exhaust valve.

3. A motor of the class described, comprising a cylindrical case, a hub rotative in the axis of the case, an abutment between the hub and case having an inlet chamber provided with opposing openings in its walls, a valve in said chamber adapted to alternately close said openings, tubular guide members on said valve slidable in said openings, said members having lateral openings near the valve, a radial piston attached to the hub, and a plunger in the piston to engage the guide members and shift the valve.

4. A motor of the class described, comprising a cylindrical case, a rotative hub in the axis of the case, a radially disposed piston attached to the hub, an abutment between the hub and case having an inlet and an exhaust chamber, each chamber having opposing openings in its walls, a valve within the inlet chamber adapted to alternately close said openings, tubular guide members on said valve slidable in said openings and having lateral openings near the valve, a spool valve extending through the exhaust chamber and outside the same and longitudinally shiftable to close the said openings, a plunger longitudinally movable in the piston to engage and shift the inlet valve, and projections on the piston to engage and shift the exhaust valve.

In testimony whereof I affix my signature in presence of two witnesses.

J RAYMOND PLANK.

Witnesses:
HAROLD O. VAN ANTWERP,
LUTHER V. MOULTON.

---

Copies of this patent may be obtained for five cents each, by addressing the "Commissioner of Patents, Washington, D. C."